United States Patent
Wu

(10) Patent No.: US 9,507,184 B2
(45) Date of Patent: Nov. 29, 2016

(54) DISPLAY MODULE AND A DISPLAY DEVICE FOR 2-DIMENSIONAL AND 3-DIMENSIONAL DISPLAYS

(71) Applicant: BOE TECHNOLOGY GROUP CO., LTD., Beijing (CN)

(72) Inventor: Yanbing Wu, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 37 days.

(21) Appl. No.: 14/074,811

(22) Filed: Nov. 8, 2013

(65) Prior Publication Data
US 2014/0168193 A1    Jun. 19, 2014

(30) Foreign Application Priority Data

Dec. 14, 2012   (CN) .......................... 2012 1 0546627

(51) Int. Cl.
G09G 3/36        (2006.01)
G02F 1/13        (2006.01)
G02B 27/22       (2006.01)

(52) U.S. Cl.
CPC ............. *G02F 1/13* (2013.01); *G02B 27/2214* (2013.01)

(58) Field of Classification Search
USPC .......................................................... 345/87
See application file for complete search history.

(56) References Cited

U.S. PATENT DOCUMENTS

| | | | |
|---|---|---|---|
| 2011/0170026 A1* | 7/2011 | Lin | G02B 27/2214 349/15 |
| 2012/0105750 A1* | 5/2012 | Yoon et al. | 349/15 |
| 2013/0241922 A1* | 9/2013 | Kim | H04N 13/0409 345/419 |
| 2013/0321482 A1* | 12/2013 | Goro et al. | 345/690 |

FOREIGN PATENT DOCUMENTS

| | | |
|---|---|---|
| CN | 201037882 | 3/2008 |
| CN | 102436101 | 5/2012 |
| CN | 202956569 | 5/2013 |
| JP | 2011169949 | 9/2011 |
| WO | 2012117692 | 9/2012 |

OTHER PUBLICATIONS

P.R. China, First Office Action, App. No. 201210546627.8, Nov. 15, 2014.

* cited by examiner

*Primary Examiner* — Long D Pham
(74) *Attorney, Agent, or Firm* — Bakerhostetler LLP

(57) ABSTRACT

The embodiment of present invention provides a display module and a display device. The display module comprises a display panel and a 3D display element. The 3D display element includes a first substrate and a second substrate arranged opposite to each other. A first common electrode is arranged on the first side of the first substrate, which is the side opposite to the second substrate, and a signal electrode is arranged on the second substrate on the side opposite to the first substrate. A distance between the first substrate and the display panel is less than a distance between the second substrate and the display panel, and the first common electrode is provided with a constant voltage.

13 Claims, 1 Drawing Sheet

DISPLAY MODULE AND A DISPLAY DEVICE FOR 2-DIMENSIONAL AND 3-DIMENSIONAL DISPLAYS

CROSS REFERRENCE OF RELATED APPLICATIONS

The present application is based on and claims the benefit of priority of Chinese Patent Application No. 201210546627.8 filed on Dec. 14, 2012, the entire contents of which are hereby incorporated by reference.

TECHNICAL FIELD

The embodiment of the present invention relates to the field of liquid crystal display technology, in particular to a display module and a display device.

BACKGROUND

In liquid crystal display technology, a parallax-barrier method is usually used to achieve 3D display. In this method, a display unit and a parallax barrier are used, and the parallax barrier, as an optical element having transparent portions and light-shielding stripes arranged periodically, is arranged below the display unit.

Based on the above principle, there exist three kinds of elements for achieving 3D display, i.e., liquid crystal shutter slit grating (active barrier), liquid crystal lens grating and active retarder. As shown in FIG. 1, a display panel 1 is arranged below a 3D element 2, through which a 3D image can be viewed by a user.

Recently, the display panel 1 usually adopts a liquid crystal mode of horizontal deflection, including IPS, FFS, and so on. Such a display panel has the advantages such as no ripples occur while being pressed, and has a wide viewing angle. However, the liquid crystal display panel using this technology is easily interrupted by an external signal. In the prior art, a layer of transparent electrodes 3 (as shown in FIG. 1) is usually arranged outside the display panel 1 so as to shield the interference from the external signal. But new elements are required in this approach which will cause increasing in production cost.

SUMMARY

An object of an embodiment according to the present invention is to provide a display module and a display device, so as to prevent image display of a display panel from being interfered by an external signal without a shielding layer.

In one aspect, an embodiment according to the present invention provides a display module, comprising a display panel and a 3D display element. The 3D display element includes a first substrate and a second substrate arranged opposite to each other, wherein the first substrate consists of two sides, i.e., a first side opposite to the second substrate, and a second side opposite to the display panel. A first common electrode is arranged on the first side of the first substrate, and a signal electrode is arranged on the second substrate on the side opposite to the first substrate. A distance between the first substrate and the display panel is less than a distance between the second substrate and the display panel, and the first common electrode is provided with a constant voltage.

Preferably, in the display module mentioned above, the second side of the first substrate is attached to the display panel.

Preferably, in the display module mentioned above, a region on the first substrate for arranging the first common electrode covers an area greater than or equal to the area of a display region of the display panel.

Preferably, in the display module mentioned above, when the 3D display element is in an off state, the first common electrode and the signal electrode are connected to the ground or are zero simultaneously.

Preferably, in the display module mentioned above, the display panel includes a display panel electrode connected to the first common electrode, and a pixel electrode.

Preferably, in the display module mentioned above, the display panel common electrode is connected to the first common electrode via peripheral circuits on the first substrate and the display panel.

Preferably, in the display module mentioned above, a liquid crystal layer is arranged between the first substrate and the second substrate.

Preferably, in the display module mentioned above, the 3D display element is a liquid crystal lens grating.

In another aspect, an embodiment according to the present invention further provides a display device comprising a backlight source and the above-mentioned display module.

DETAILED DESCRIPTION

To make the objects, the technical solutions and the advantages of the embodiment according to the present invention more apparent, embodiments of the present invention will be described hereinafter in conjunction with the drawings and the embodiments.

The embodiment of the present invention provides a display module for 3D display. In the display module, a common electrode is arranged at a side closer to a display panel to reduce crosstalk for the display panel due to voltage variations of a signal electrode, and to shield interference from an external signal to the display panel. As a result, it is able to reduce the interference and the cost without an additional shielding layer or without increasing the thickness of the display module.

Figure 1:
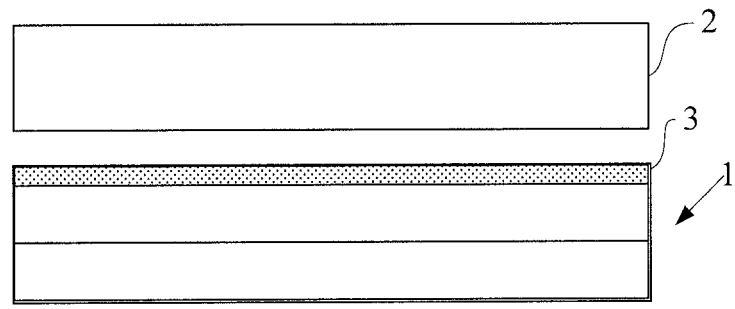
FIG. 1 is a schematic view showing a display module in prior art.
Figure 2:
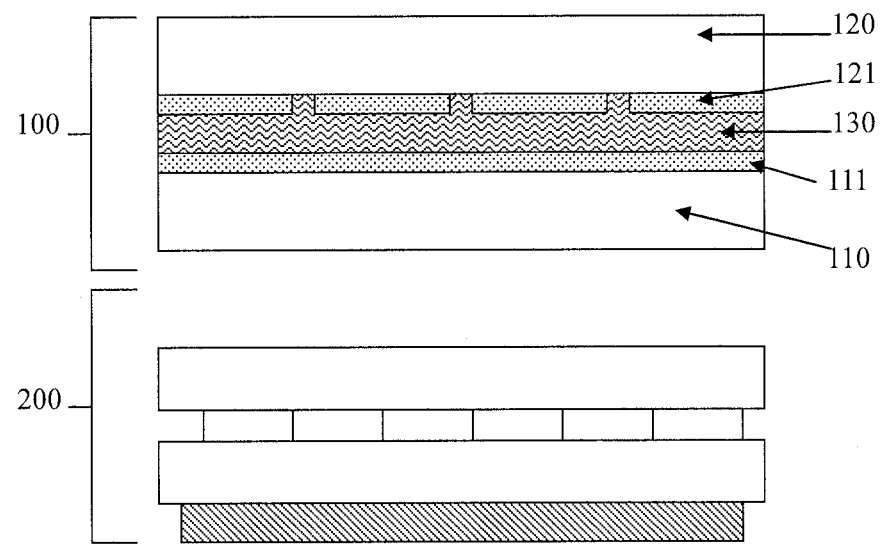
FIG. 2 is a schematic view showing a display module according to an embodiment according to the present invention.

As shown in FIG. 2, the display module comprises a 3D display element 100 and a display panel 200 which is arranged below the 3D display element 100. The 3D display element 100 comprises:

a first substrate 110, which consists of two sides, i.e., a first side opposite to a second substrate, and a second side opposite to the display panel, a common electrode 111 is arranged on the first side; and a second substrate 120, which is arranged opposite to the first substrate 110, and a signal electrode 121 is arranged on the second substrate on the side opposite to the first substrate, wherein a distance between the first substrate 110 and the display panel 200 is less than a distance between the second substrate 120 and the display panel 200.

In other words, according to the display module of the embodiment according to the present invention, take the arrangement and orientation shown in FIG. 2 for instance, the common electrode 111 of the 3D display element 100 is arranged below, while the signal electrode 121 is arranged above, so that the common electrode 111 is closer to the display panel 200 and the signal electrode 121 is far away from the display panel 200. As a result, it is able to reduce crosstalk for the display panel 200 due to voltage variations on the signal electrode, as well as to shield interference from an external signal to the display panel 200, thus, it is possible to reduce interference without arranging an additional transparent electrode on the display panel 200 as a shielding layer.

In addition, in order to ensure that the common electrode 111 can serve as a shielding layer for the display panel 200, when the 3D display element 100 is in an operating state and can achieve the 3D display, a voltage of a common signal input to the common electrode 111 will maintain constant. If it is able to ensure normal operation of the 3D display element 100, the constant voltage will be zero. If the zero voltage is unable to ensure the normal operation of the 3D display element 100, the constant voltage will be a nonzero voltage. When the 3D display element 100 is turned off and the 3D display is not required, the common electrode 111 and the signal electrode 121 can be connected to the ground or are blank simultaneously. As a result, it is able to provide a shielding layer for the display panel 200, as well as to ensure that an electric field of liquid crystal molecules of a liquid crystal layer 130 between the first substrate 110 and the second substrate 120 is zero.

Optimally, the second side of the first substrate 110, on which the common electrode 111 is not arranged is attached to the display panel 200. A region on the first substrate 110 for arranging the common electrode 111 covers an area greater than or equal to an area of a display region of the display panel 200, and preferably covers the entire display panel 200, so as to prevent the peripheral electrodes from being interfered by the external signal.

In the display module, the 3D display element 100 may be one of an active barrier, a liquid crystal grating and an active retarder. When it is arranged in the display module as mentioned above, the common electrode 111 is closer to the display panel 200 and the signal electrode 121 is far away from the display panel 200. When the 3D display element 100 is in an off state, the common electrode and the signal electrode are connected to the ground or are zero simultaneously, so as to provide a shielding layer for the display panel 200. When the 3D display element 100 is in an operating state, a voltage of the common signal input to the common electrode 111 will maintain constant, and a signal voltage of the signal electrode 121 is set according to the common signal voltage, so as to meet the 3D display requirements of the 3D display element 100. A person skilled in the art shall be aware of the structure when the 3D display element 100 is any one of the active barrier, the liquid crystal lens grating and the active retarder respectively, and such structures will not be detailedly described herein.

In addition, it should be appreciated that a display panel common electrode and a pixel electrode may also be arranged on the display panel 200. The display panel common electrode arranged on the display panel 200 is connected to the common electrode 111 of the display module. Preferably, the common electrode arranged on the display panel 200 is connected to the common electrode 111 of the 3D display element 100 via peripheral circuits on the first substrate 110 and the display panel 200, e.g., via a FPCB on the 3D display element 100 and a PCB on the display panel 200. A person skilled in the art shall be aware of the above connection modes, which will not be detailedly described herein.

Another aspect of the embodiment according to the present invention further provides a display device, comprising a backlight source, a display panel and a 3D display element. The 3D display element, as shown in FIG. 2, comprises a first substrate 110 and a second substrate 120 arranged opposite to each other, wherein the first substrate consists of two sides, i.e., a first side opposite to the second substrate, and a second side opposite to the display pane. A common electrode 111 is arranged on the first side of the first substrate 110, which is the side on the first substrate that opposite to the second substrate, and a signal electrode 121 is arranged on the second substrate 120 on the side opposite to the first substrate. A distance between the first substrate 110 and the display panel 200 is less than a distance between the second substrate 120 and the display panel 200.

In other words, according to the display device of the embodiment according to the present invention, take the arrangement and orientation shown in FIG. 2 for instance, the common electrode 111 of the 3D display element 100 is arranged below while the signal electrode 121 is arranged above, so that the common electrode 111 is close to the display panel 200 and the signal electrode 121 is far away from the display panel 200. As a result, it is able to reduce crosstalk for the display panel 200 due to voltage variations of the signal electrode and to shield interference from an external signal to the display panel 200, without arranging an additional transparent electrode on the display panel 200 as a shielding layer.

In addition, in order to ensure that the common electrode 111 can serve as a shielding layer for the display panel 200, when the 3D display element 100 is in an operating state and can achieve the 3D display, a voltage of a common signal input to the common electrode 111 will maintain constant. If it is able to ensure normal operation of the 3D display element 100, the constant voltage will be zero. If the zero voltage is unable to ensure the normal operation of the 3D display element 100, the constant voltage will be a nonzero voltage. When the 3D display element 100 is turned off and the 3D display is not needed, the common electrode 111 and the signal electrode 121 are connected to the ground or are blank simultaneously. As a result, it is able to provide a shielding layer for the display panel 200, as well as to ensure that an electric field of liquid crystal molecules of a liquid crystal layer 130 between the first substrate 110 and the second substrate 120 is zero. A person skilled in the art shall be aware of the structure when the 3D display element 100 is any one of the active barrier, the liquid crystal lens grating and the active retarder respectively, and such structures will not be detailedly described herein.

Optimally, the second side of the first substrate 110 is attached to the display panel 200. A region on the first substrate 110 for arranging the common electrode 111 covers an area greater than or equal to an area of a display region of the display panel 200, and preferably covers the entire display panel 200, so as to prevent the peripheral electrodes of the common electrodes 111 form being interfered by the external signal.

According to the display module and the display device of the embodiment mentioned above according to the present invention, the common electrode is arranged at a side closer to the display panel to reduce crosstalk for the display panel due to voltage variations of the signal electrode, and to shield interference from an external signal to the display panel. As a result, it is able to reduce the interference and the cost without an additional shielding layer or without increasing the thickness of the display module.

The above are merely the preferred embodiments of the present invention. It should be noted that, a person skilled in the art may make further improvements and modifications without departing from the principle of the present invention, and these improvements and modifications shall also be considered as the scope of the present invention.

What is claimed is:

1. A display module, comprising a display panel and a 3D display element, wherein the 3D display element includes a first substrate and a second substrate arranged opposite to each other, the first substrate consists of a first side opposite to the second substrate and a second side opposite to the display panel, a first common electrode is arranged on the first side of the first substrate, a signal electrode is arranged on the second substrate on the side opposite to the first substrate, and a distance between the first substrate and the display panel is less than a distance between the second substrate and the display panel, and the first common electrode is provided with a constant voltage, wherein the display panel includes a display panel common electrode which is directly and electrically connected to the first common electrode, and a pixel electrode.

2. The display module according to claim 1, wherein the second side of the first substrate is attached to the display panel.

3. The display module according to claim 1, wherein a region on the first substrate for arranging the first common electrode covers an area greater than or equal to the area of a display region of the display panel.

4. The display module according to claim 1, wherein when the 3D display element is in an off state, the first common electrode and the signal electrode are connected to the ground or are zero simultaneously.

5. The display module according to claim 1, wherein the display panel common electrode is connected to the first common electrode via peripheral circuits on the first substrate and the display panel.

6. The display module according to claim 1, wherein a liquid crystal layer is arranged between the first substrate and the second substrate.

7. The display module according to claim 6, wherein the 3D display element is a liquid crystal lens grating.

8. A display device, comprising a backlight source and the display module according to claim 1.

9. The display device according to claim 8, wherein a region on the first substrate of the display module for arranging the first common electrode covers an area greater than or equal to the area of a display region of the display panel.

10. The display device according to claim 8, wherein when the 3D display element in the display module is in an off state, the first common electrode and the signal electrode are connected to the ground or are zero simultaneously.

11. The display device according to claim 8, wherein the second side of the first substrate of the display module is attached to the display panel.

12. The display device according to claim 8, wherein the display panel common electrode of the display module is connected to the first common electrode via peripheral circuits on the first substrate and the display panel.

13. The display module according to claim 12, wherein a liquid crystal layer is arranged between the first substrate and the second substrate in the display module, and the 3D display element is a liquid crystal lens grating.

* * * * *